US006547914B2

(12) United States Patent
Schnitzer et al.

(10) Patent No.: US 6,547,914 B2
(45) **Date of Patent: *Apr. 15, 2003**

(54) SELF-ADHESIVE LABEL WITH POCKET-FORMING SLOT

(75) Inventors: David H. Schnitzer, Buffalo Grove, IL (US); Bryce C. Waggoner, Monroe, OH (US); Kenneth A. Marin, Jr., Itasca, IL (US)

(73) Assignee: The Standard Register Company, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/373,931

(22) Filed: Aug. 13, 1999

(65) Prior Publication Data

US 2003/0021931 A1 Jan. 30, 2003

(51) Int. Cl.[7] .................................................. B32B 31/00

(52) U.S. Cl. ........................ 156/250; 156/268; 156/292; 428/40.1; 428/41.8; 428/42.1; 428/42.2; 281/15.1; 281/31; 281/51; 40/638; 40/654.01; 283/81

(58) Field of Search ............................... 428/40.1, 41.8, 428/42.1, 42.2; 40/654.01, 638; 281/15.1, 31, 51; 156/250, 268, 292; 283/81

(56) References Cited

U.S. PATENT DOCUMENTS

| | | | | | |
|---|---|---|---|---|---|
| 3,424,636 | A | * | 1/1969 | Brody | 156/201 |
| 3,592,381 | A | * | 7/1971 | Brody | 229/74 |
| 5,267,898 | A | * | 12/1993 | Doll et al. | 462/6 |
| 5,427,640 | A | * | 6/1995 | Daniels | 156/250 |

FOREIGN PATENT DOCUMENTS

| | | | | |
|---|---|---|---|---|
| DE | 3313879 | A | * | 10/1984 |
| JP | 10236019 | A | * | 9/1998 |

* cited by examiner

*Primary Examiner*—Michael Barr
*Assistant Examiner*—Elena Tsoy
(74) *Attorney, Agent, or Firm*—Killworth, Gottman, Hagan & Schaeff LLP

(57) ABSTRACT

A self-adhesive label is provided for displaying useful information about an object to which the label is affixed. The label is formed with a face layer constructed out of heavy paper, such as cardstock, and having a first planar surface which is suitable to receive printed indicia thereon. An adhesive layer coats a second planar surface of the face layer and includes a pocket-forming window therein, which is in communication with a slot in the face layer, and adhesively affixes the face layer to the object. The pocket-forming window defines an item receiving pocket between the object and the face layer, wherein the item-receiving pocket is accessible through the slot, for example, to removably insert a card therein. A sheet of labels is also provided having two or more labels thereon, wherein each of the two or more labels are removable from the sheet for individual use thereof.

24 Claims, 11 Drawing Sheets

SELF-ADHESIVE LABEL WITH POCKET-FORMING SLOT

BACKGROUND OF THE INVENTION

1. Technical Field of the Invention

The present invention relates to self-adhesive labels for displaying useful information about an object to which the label is affixed. More particularly, the present invention relates to such a self-adhesive label in which the label defines a pocket with the object to which it is affixed and in which the label defines a slot communicating with the pocket to permit the insertion of a card into the pocket.

2. Description of the Related Art

Self-adhesive labels for displaying useful information about an object to which one or more of the labels are affixed are generally known in the art. For example, with reference to FIG. 1, many libraries affix a self-adhesive label "L" to an inside surface of a front cover "V" of each library book "B" to identify, for example, the name of the library, the title of the book "B" and the so-called "Dewey Decimal" classification number of the book. Labeling each book "B" of a library's inventory in this manner, then, facilitates efficient storage and retrieval of any book from among the large number of other books typically superintended by the library. Because libraries often customize the information to be printed on each label, "L", it is further desirable to provide such a label which can be printed with variable information by conventional office printing equipment, such as a laser printer.

A label "L" of the style typically used by a library to identify the book "B" to which the label "L" is affixed often includes indicia whereby a library patron borrowing the book is reminded of the date before which the book must be returned to the library. For example, referring again to FIG. 1, the label "L" may include an upper portion having a grid "G" printed thereon, whereby a library clerk uses one or more cells "O" of the grid "G" to stamp or hand-write the return date of the book therein. The label "L" may be reused each time a library patron borrows the book to remind the patron borrowing the book when the book must be returned to the library. Once all cells "O" of the grid have been used, either the used label "L" is removed from the book "L" and a fresh label is affixed to the book "B" in its place, or the fresh label is superimposed over the used label "L". Each time a fresh label is to be affixed to a book, the useful information, such as the library name and that book's particular title and classification number, must be printed on the label before the label is affixed to the book "B". It is therefore desirable to provide a label for displaying useful information about an object to which the label is affixed, wherein a plurality of "stock" labels are provided suitable for individual customization of each.

Commonly a library monitors which books of its inventory are currently being borrowed by its patrons by providing a removable check-out card "C" for each book "B", wherein the check-out card "C" includes useful information relating to the book "B" for which it is provided, such as, for example, the name of the library, the name of the book "B" and the so-called "Dewey Decimal" classification number of the book "B". Typically, each book's check-out card "C" is placed within a pocket "P" formed adjacent the inside surface of the book's front cover "V" and removed by the clerk prior to releasing the book "B" to a patron wishing to borrow it. A review of all cards "C" which have been removed from books "B", then, indicates the quantity (and identities) of all books "B" which have been borrowed from the library by its patrons.

With additional reference to FIGS. 2 and 3, an item-receiving pocket "P" typical of those known in the art is formed from a planar sheet of foldable material "M", such as cardstock, having first and second planar surfaces "$S_1$", "$S_2$", respectively. The planar sheet "M" includes first and second side flaps "$F_1$", "$F_2$", respectively, which are inwardly foldable over first and second side fold lines "$Y_1$", "$Y_2$", respectively, and a lower flap "$F_3$" which is upwardly foldable over a third fold line "$Y_3$", such that the second planar surface "$S_2$" of each flap "$F_1$", "$F_2$", "$F_3$" is foldable over the second planar surface "$S_2$" of a center portion "$M_c$" of the planar sheet "M". The first planar surface "$S_1$" of each flap "$F_1$", "$F_2$", "$F_3$" is adhesively affixable to the inside surface of the front cover "V" of the book "B", thereby forming a pocket "P" between the inside surface of the book cover "V" and the second planar surface "$S_2$" of the planar sheet "M". The card "C" is thereby removably received within the pocket "P" and contained within the book "B" until such time as the clerk removes the card "C". It is therefore even further desirable to provide a label for displaying information about an object to which the label is affixed, wherein the label includes means for receiving items, such as library book check-out cards.

Moreover, the size, shape and geometry of the planar sheet "M" used to form the prior art item-receiving pocket "P" is not suited for passing the planar sheet "M" through conventional office printing equipment, and particularly, through conventional non-impact printers, such as laser printers or the like. A library using the planar sheet "M", then, finds it difficult to use the item-receiving pocket "P" as a means of displaying information. It is therefore desirable to provide a label for displaying information about an object to which the label is affixed, wherein the label includes means for receiving items, such as library book check-out cards, and wherein the label can be printed with variable information by conventional office printing equipment, such as a laser printer.

SUMMARY OF THE INVENTION

The present invention is for a self-adhesive label for displaying useful information about an object to which the label is affixed. The label is formed with a face layer constructed out of heavy paper, such as cardstock, and having a first planar surface which is suitable to receive printed indicia thereon. An adhesive layer coats a second planar surface of the face layer and includes a pocket-forming window therein, which is in communication with a slot in the face layer, and adhesively affixes the face layer to the object. The pocket-forming window defines an item-receiving pocket between the object and the face layer, wherein the item-receiving pocket is accessible through the slot, for example, to removably insert a card therein. A sheet of labels is also provided having two or more labels thereon, wherein each of the two or more labels are removable from the sheet for individual use thereof.

A label according to a preferred embodiment of the present invention includes a face layer having a first planar surface and a second planar surface, the face layer having a slit therein; and, an adhesive layer superimposed over the second planar surface of the face layer to adhesively affix at least a portion of the face layer to the object so as to define an item-receiving pocket between the object and the face layer, the item-receiving pocket being in communication with the slit.

It is an object of the present invention to provide a label for displaying useful information about an object to which the label is affixed.

It is another object of the present invention to provide a label for displaying useful information about an object to which the label is affixed, wherein conventional office printing equipment, such as a laser printer, may be used to print the useful information onto the label.

It is another object of the present invention to provide a label for displaying useful information about an object to which the label is affixed, wherein a plurality of "stock" labels are provided suitable for individual customization of each.

It is yet another object of the present invention to provide a label for displaying useful information about an object to which the label is affixed, wherein the label includes means for receiving items, such as library book check-out cards, therein.

It is still another object of the present invention to provide a label for displaying information about an object to which the label is affixed, wherein the label includes means for receiving items, such as library book check-out cards, and wherein the label can be printed with variable information by conventional office printing equipment, such as a laser printer.

These and additional objects, features and advantages of the present invention will become apparent to those reasonably skilled in the art from the description which follows, and may be realized by means of the instrumentalities and combinations particularly pointed out in the claims appended hereto.

BRIEF DESCRIPTION OF THE DRAWINGS

A better understanding of the present invention will be had upon reference to the following description in conjunction with the accompanying drawings in which like reference numerals represent like parts, and wherein.

DETAILED DESCRIPTION OF THE PREFERRED EMBODIMENTS

Figure 5:
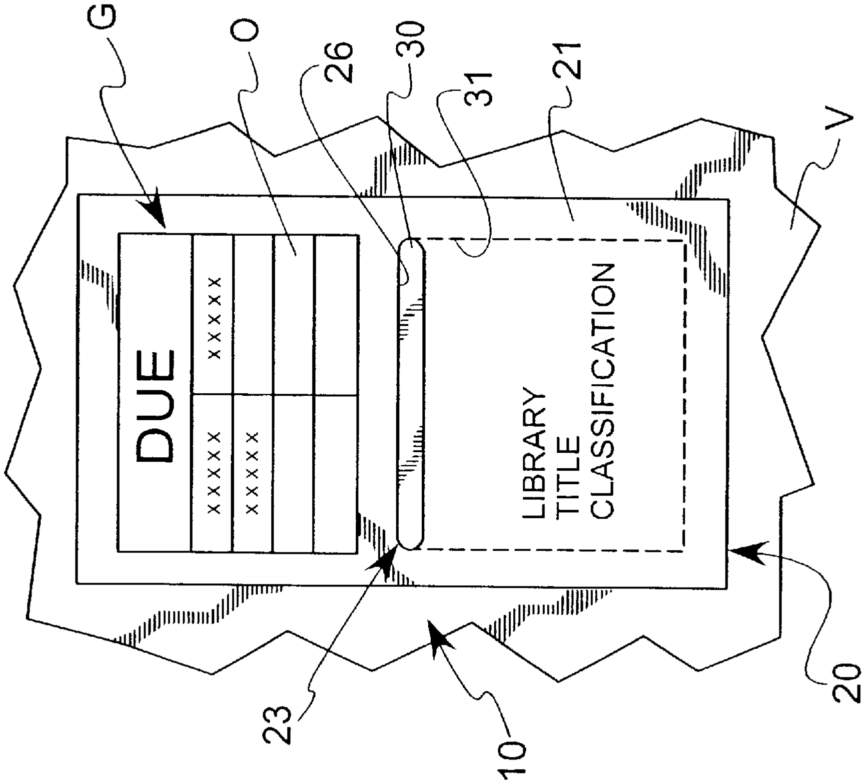
FIG. 5 is a front view of the label of FIG. 4, shown affixed to the inside surface of the book of FIG. 4.
Figure 4:
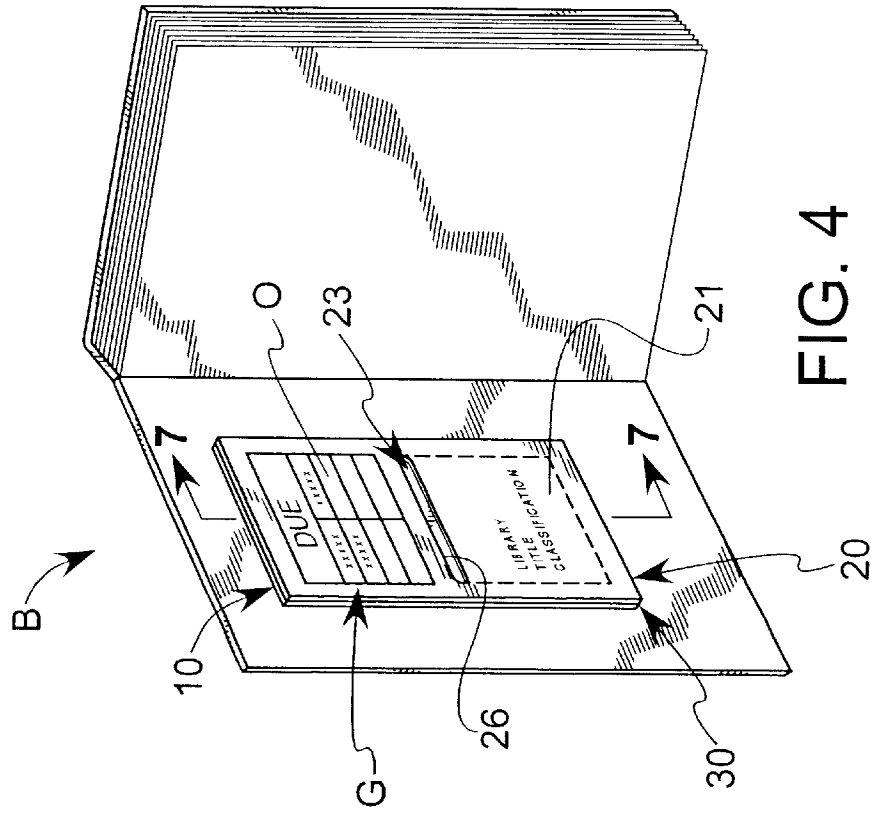
FIG. 4 is an oblique view of a book having a label according to a preferred embodiment of the present invention affixed to an inside surface thereof.

With combined reference to FIGS. 4 and 5, a label 10 according to a preferred embodiment of the present invention is affixable to an object to display information about the object. For example, the label 10 may be affixed to the inside surface of the front cover "V" of a library book "B" to identify the library, to display the title of the book and to indicate the so-called "Dewey Decimal" classification number of the book "B". The label 10 may also include indicia, such as a grid "G", into the cells "O" of which a library clerk may stamp or hand-write the return date of the book "B" each time a library patron borrows the book from the library.

Figure 7:
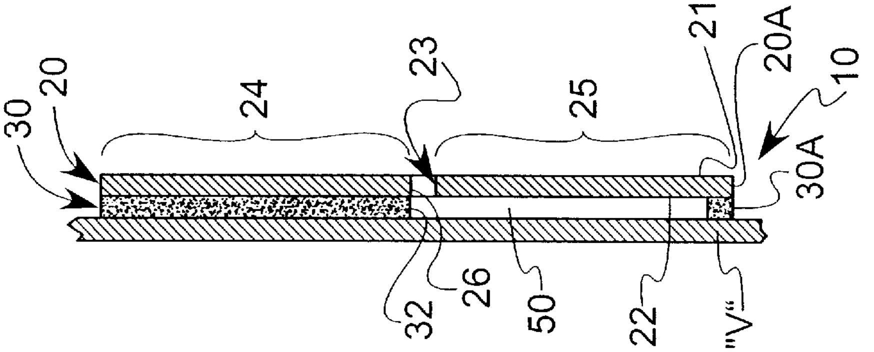
FIG. 7 is a section view of the label shown affixed to the book along section line 7—7 of FIG. 4, and showing a face layer thereof being superimposed over an adhesive layer thereof, wherein the scale of the layers is not shown in proportion to one another so that each layer may be clearly viewed.
Figure 6:
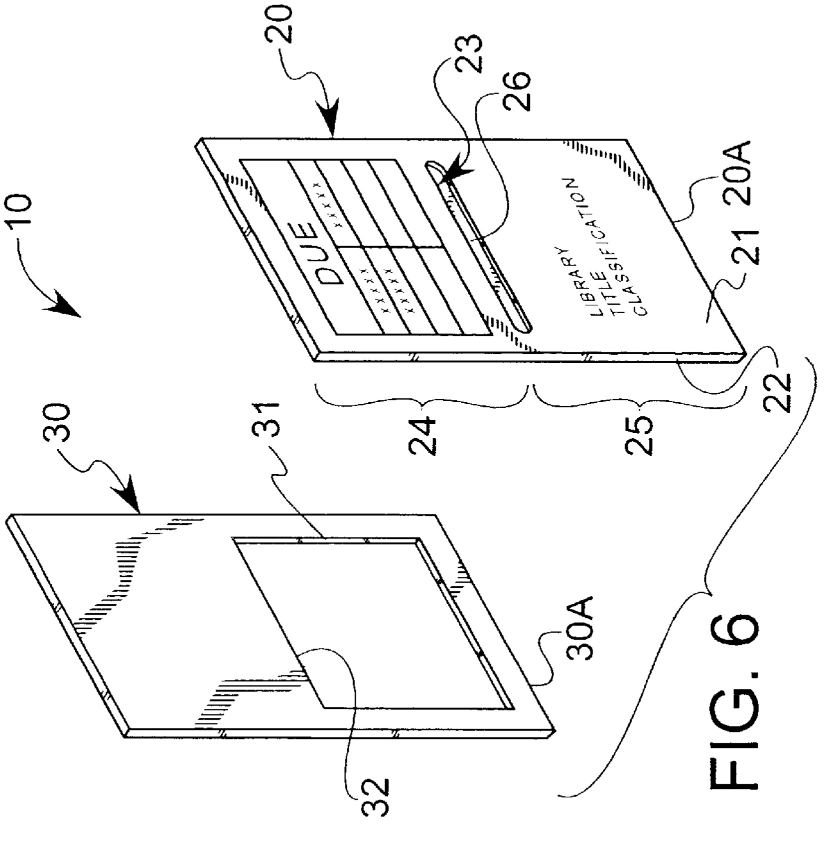
FIG. 6 is an exploded oblique view of the label of FIG. 4, showing a face layer being superimposed over an adhesive layer, wherein the scale of the layers is not shown in proportion to one another so that each layer may be clearly viewed.

With additional reference to FIGS. 6 and 7, the label 10 includes an adhesive layer 30 and a face layer 20 being superimposed over the adhesive layer 30. The adhesive layer 30 is typically applied to one planar surface of the face layer 20 using any conventional adhesive coating technique. The adhesive layer is shown in the Figures as separate from the face layer 20, but it will be understood that adhesive layer 30 is not self-supporting and is shown in this manner only for the purpose of clarity. The face layer 20 is preferably constructed of any suitable heavy-weight paper material, such as cardstock, which is suitable for passing through conventional office printing equipment, for example, impact printers and non-impact printers, such as laser jet, ink jet, thermal, ion deposition or magnetography printers. Moreover, the face layer 20 is constructed of a suitable material which may be adapted to receive handwritten indicia thereon.

The face layer 20 is of a generally rectangular shape having a first planar surface 21 onto which useful information is printed as described in greater detail below and a second planar surface 22 onto which the adhesive layer 30 is coated to permit adhesive affixing of the label 10 onto the inside surface of the cover "V" of the book "B". A slot 23 substantially divides the face layer 20 into upper and lower regions 24, 25, respectively. Identifying information, such as the name of the library, the title of the book and any classification number associated with the book is printed using conventional office printing equipment, such as a laser printer, onto the first planar surface 21 of the face layer 20 in the lower region 25 thereof. Typically, a library will purchase the label 10 such that the lower region 25 of the face layer 20 is free of any identifying information, thereby permitting the library to print customized information thereon using standard library office equipment. The grid "G" is typically pre-printed on the first planar surface 21 of the face layer 20 in the upper region 24 thereof. Alternatively, the entire first planar surface 21 of the face layer 20 may be free of any pre-printed indicia thereon, in which case, the library may customize the information to be printed in both the upper region 24 and the lower region 25.

Figure 8:
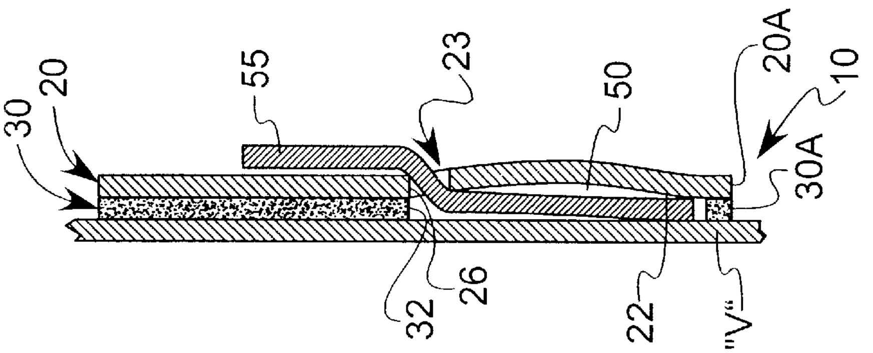
FIG. 8 is a section view of the label shown affixed to the book along section line 7—7 of FIG. 4, and showing a card being partially received within an item-receiving pocket formed between the label and the book.

With additional reference to FIG. 8, the adhesive layer 30 includes a pocket-forming window 31 having an upper edge 32 coincident with an upper edge 26 of the face layer slot 23. Preferably, upper edge 32 of the pocket-forming window 31 is spaced from the upper edge 26 of the face layer by a nominal distance to prevent oozing of adhesive material beyond edge 26. Window 31 defines a portion of the second planar surface 22 of the face layer lower region 25 which is not adhesively affixed to the cover "V" of the book "B". The pocket-forming window 31, then, cooperates with the slot 23 to define an item-receiving pocket 50 between the book cover "V" and the lower region 25 of the face layer 20 which is accessible through the slot 23. A card 55, such as, for example, a library check-out card 55, can be inserted into the item-receiving pocket 50 through the slot 23.

Although the preferred embodiment of FIGS. 4–8 has been described with respect to labels for use by libraries, numerous alternative uses are contemplated which should be apparent to one skilled in the art upon reading the present description. The labels according to the present invention may be used to hold various items, such as postcards, business cards, greeting cards, letters, certificates, coupons or the like, without departing from either the spirit or the scope of the present invention. For example, a label according to the preferred embodiment hereof may be adhesively affixed to an inside surface of a conventional greeting card to hold a gift certificate therein.

Figure 10:
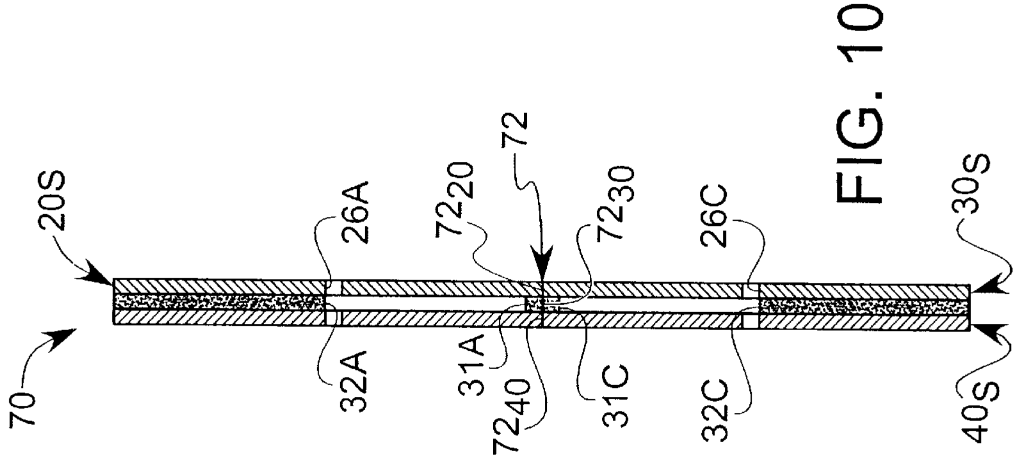
FIG. 10 is a section view of the label sheet of FIG. 9, shown along section line 10—10 of FIG. 9.
Figure 9:
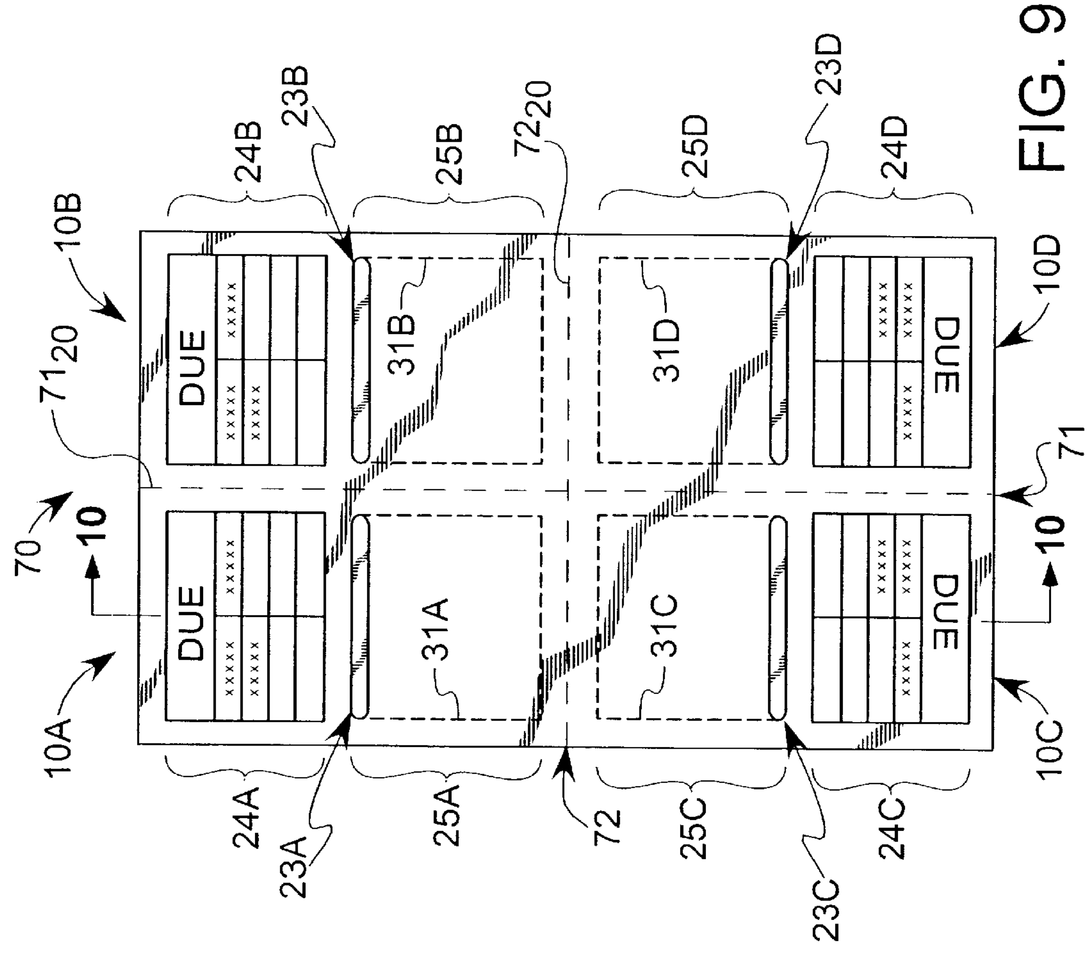
FIG. 9 is a top view of a label sheet having a plurality of labels according to the preferred embodiment of the present invention integrally-formed therewith.
Figure 11:
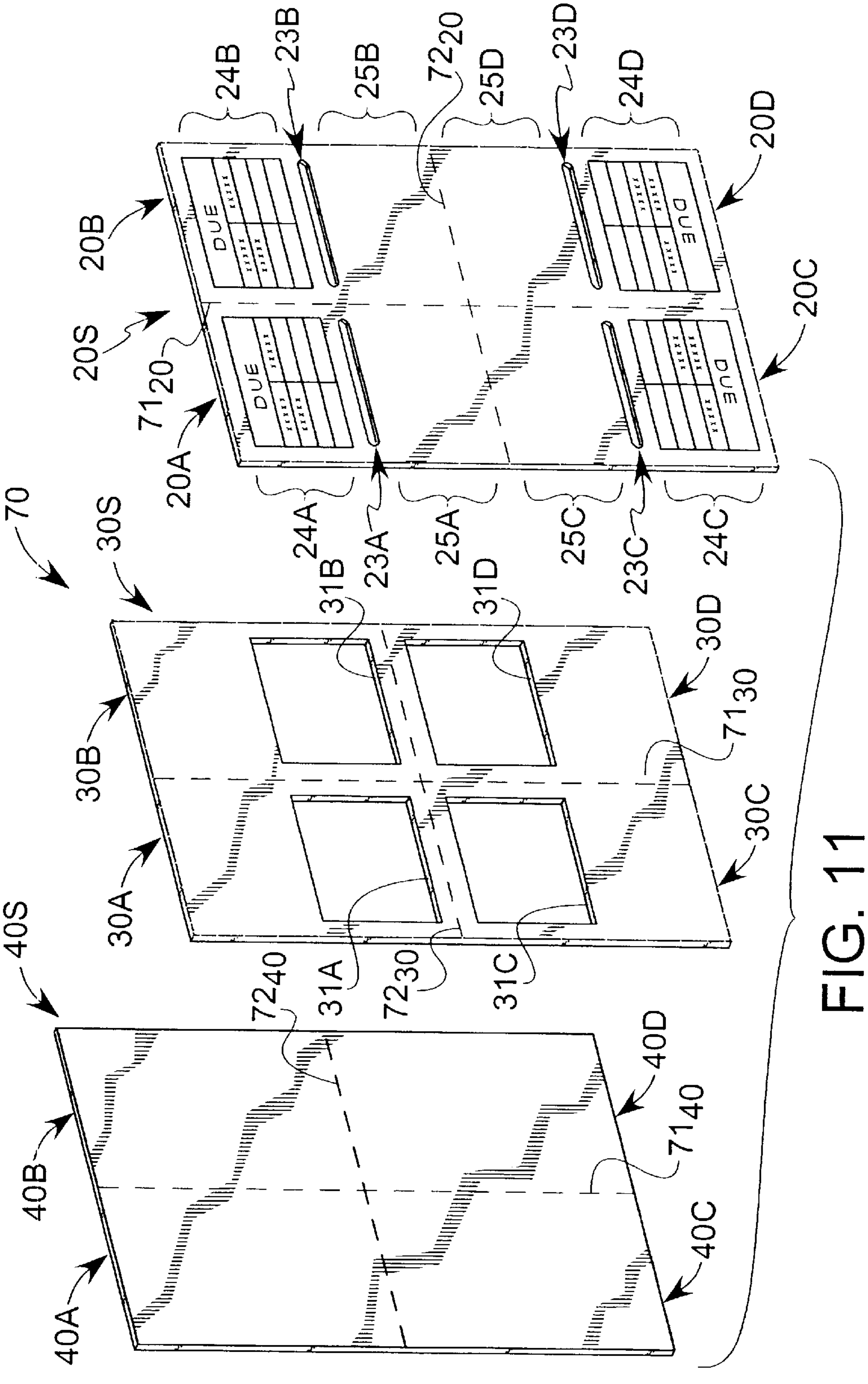
FIG. 11 is an exploded oblique view of the label sheet of FIG. 9.

With reference to FIGS. 9–11, one or more labels 10*a*, 10*b*, 10*c*, 10*d* may be integrally-formed into a single label sheet 70 and separated therefrom for individual use. For example, an 8½"×11" sheet 70 may be divided by separation lines 71, 72 into four quadrants, each quadrant defining a 4¼"×5½" label 10*a*, 10*b*, 10*c*, 10*d*. Separation lines 71, 72 may take the form of perforation lines, in which case, labels 10*a*, 10*b*, 10*c*, 10*d* may be separated from the sheet 70 and from one another simply by tearing the sheet 70 along the separation lines 71, 72. Alternatively, separation lines 71, 72 may be printed indicia to indicate where the sheet 70 should be cut using a conventional cutting tool, such as scissors. Alternatively still, separation lines 71, 72 may be not provided at all, in which case, the labels 10*a*, 10*b*, 10*c*, 10*d* are separated from the sheet 70 and from one another using a conventional cutting tool. The sheet 70 includes a face sheet 20*s* which is superimposed over a release sheet 40*s* and which is removably adhesively affixed thereto by an adhesive layer 30*s* of pressure sensitive adhesive. Sheet 20*s* and 40*s*, and layer 30*s* are sufficiently thin that the sheet 70 can pass through conventional office printing equipment, such as a laser printer, for the purposes herein described. Adhesive layer 30*s* adhesively affixes the face sheet 20*s* to the release sheet 40*s*. When the face sheet 20*s* is peeled from the release sheet 40*s*, the adhesive layer 30*s* is released from the release sheet 40*s*, which may carry a release coating of silicone or the like. Adhesive layer 30*s*, then, remains affixed to the face sheet 20*s* after the face sheet 20*s* has been peeled from the release sheet 40*s*. Layer 30*s* permits either permanent or temporary adhesive affixing of the face sheet 20*s* (as well as of the individual labels 10*a*, 10*b*, 10*c*, 10*d* to an object, such as a library book "B", as herein described. It is contemplated that any type of adhesive may be used, including heat seal or remoist adhesives. Such adhesives do not require that release sheet 40*s* be provided. Preferably, the adhesive is a pressure-sensitive adhesive, for example, acrylic-based, rubber-based or ultraviolet-radiation curable adhesives. In a preferred embodiment, a hot melt rubber based adhesive, such as, for example, a rubber-based adhesive manufactured as HM 2107 adhesive from H. B. Fuller of St. Paul, Minnesota, is utilized.

Separation line 71 includes a face sheet first separation line $\mathbf{71}_{20}$, an adhesive layer first separation line $\mathbf{71}_{30}$ and a release sheet first separation line $\mathbf{71}_{40}$, wherein the first separation lines $\mathbf{71}_{20}$, $\mathbf{71}_{30}$, $\mathbf{71}_{40}$ are substantially aligned. Separation line 72 includes a face sheet second separation line $\mathbf{72}_{20}$, an adhesive layer second line $\mathbf{72}_{30}$ and a release sheet second separation line $\mathbf{72}_{40}$, wherein the second separation lines $\mathbf{72}_{20}$, $\mathbf{72}_{30}$, $\mathbf{72}_{40}$ are substantially aligned. Where, as in the preferred embodiment hereof, separation lines 71, 72 are perforation lines passing through each sheet 20*s* and 40*s*, each label 10*a*, 10*b*, 10*c*, 10*d* may be individually removed from the sheet 70 and individually passed through a printer. This arrangement is suitable where the printer is adapted to receive printable media being less than 8½"×11" in size. An individual label 10*a*, 10*b*, 10*c*, 10*d* may be removed from the sheet 70 by tearing the separation lines 71, 72 along the inner edges of the label 10*a*, 10*b*, 10*c*, 10*d*, thereby leaving a void in the sheet 70 in the quadrant where the removed label was located.

Alternatively, separation lines 71, 72 may pass only through face sheet 20*s* and adhesive layer 30*s*, but not through release sheet 40*s*. That is, separation lines $\mathbf{71}_{40}$, $\mathbf{72}_{40}$ of the release sheet 40*s* are not provided. Removal of one label 10*a*, 10*b*, 10*c*, 10*d* from the sheet 70 does not require tearing and removal of a portion of the release sheet 40*s*, but rather, removal only of portions of the face sheet 20*s* and the adhesive layer 30*s* and peeling thereof from a portion of the release sheet 40*s*. This arrangement is preferred where the printer is not adapted to receive printable media being sized less than 8½"×11" and facilitates multiple passes of the sheet 70 through the printer. For such an arrangement, it is also preferred that separation lines 71, 72 be continuous cut lines through the face sheet 20*s* and the adhesive layer 30*s*, thereby permitting the individual labels 10*a*, 10*b*, 10*c*, 10*d* to be easily peeled and removed.

Preferably, each sheet 70 is 8½"×11" in size and includes four labels 10*a*, 10*b*, 10*c*, 10*d* occupying the four quadrants thereof. Horizontally-adjacent labels 10*a*, 10*b* and 10*c*, 10*d* are in a side-by-side orientation and share inner edges along separation line 71. Vertically adjacent labels 10*a*, 10*c* and 10*b*, 10*d* are in an opposed orientation and are mirrored about separation line 72. The face sheet portion 20*a*, 20*b*, 20*c*, 20*d* of each label 10*a*, 10*b*, 10*c*, 10*d* includes a slot 23*a*, 23*b*, 23*c*, 23*d*, respectively, which divides each label 10*a*, 10*b*, 10*c*, 10*d* into an upper region 24*a*, 25*b*, 24*c*, 24*d* having indicia, such as a book return grid hereinabove described, preprinted thereon and an unprinted lower region 25*a*, 25*b*,

25*c*, 25*d* for the library's use in printing customized information, such as the library and book identifying information above. Because of the mirrored orientation of vertically adjacent labels 10*a*, 10*c* and 10*b*, 10*d*, the unprinted lower regions 25*a*, 25*b*, 25*c*, 25*d* of each label 10*a*, 10*b*, 10*c*, 10*d* are located towards the middle of the sheet 70, whereas the printed upper regions 24*a*, 24*b*, 24*c*, 24*d* of each label 10*a*, 10*b*, 10*c*, 10*d* are located towards the outer edge of the sheet 70.

The adhesive layer 30*s* includes a pocket forming window 31*a*, 31*b*, 31*c*, 31*d* for each label 10*a*, 10*b*, 10*c*, 10*d* of the sheet 70, wherein the pocket-forming windows 31*a*, 31*b*, 31*c*, 31*d* are located on the adhesive layer 30*s* to be adjacent the lower regions 25*a*, 25*b*, 25*c*, 25*d* of the face sheet 20*s* when the face sheet 20*s* is superimposed over the release sheet 40*s* and adhesively affixed thereto by the adhesive. Each label face sheet portion 20*a*, 20*b*, 20*c*, 20*d* is adhesively affixed to its corresponding label release sheet portion 40*a*, 40*b*, 40*c*, 40*d*, at all locations thereon except within the pocket-forming window 31*a*, 31*b*, 31*c*, 31*d*. Moreover, the pocket-forming windows 31*a*, 31*b*, 31*c*, 31*d* of each label 10*a*, 10*b*, 10*c*, 10*d* are located immediately adjacent the slots 23*a*, 23*b*, 23*c*, 23*d*, respectively, to permit the pocket of each label 10*a*, 10*b*, 10*c*, 10*d* to be accessed therethrough.

Figure 12:
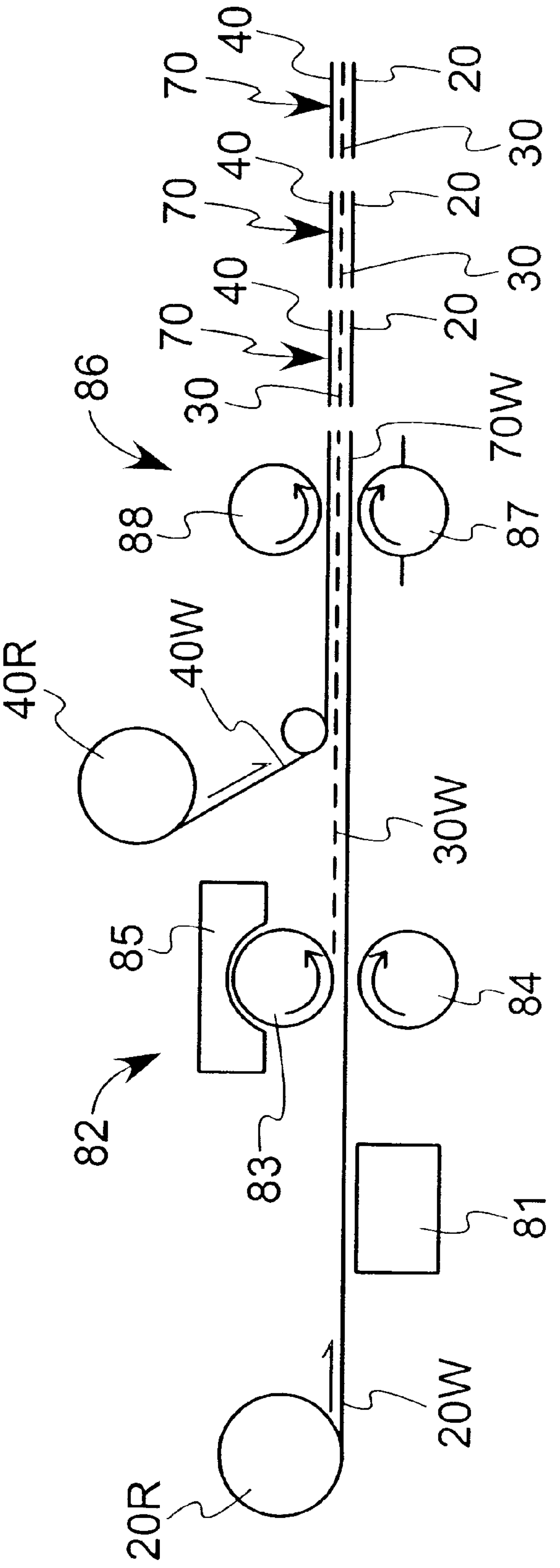
FIG. 12 is a diagrammatic view of a process for forming the label sheet of FIG. 9.

With additional reference to FIG. 12, individual label sheets 70 are formed by providing a rolled web 20*w* of face sheet material, for example, cardstock, to which a rolled web 40*w* of release sheet material is adhesively secured. The face sheet material web 20*w* is unrolled from a first roll 20*r* and passed through a conventional printing machine 81, which prints on one surface thereof predetermined indicia, such as, for example, the grid "G" (FIGS. 4, 5 and 9) used by libraries to remind patrons of the return date of borrowed library book. Printer 81 may print at spaced intervals along the face sheet material web 20*w* any indicia which shall appear without variation on each label sheet 70. Although printer 81 is illustrated as printing the non-variable indicia on the web 20*w* as the web 20*w* is unrolled from roll 20*r*, it will be understood that printer 81 may be located at any point desired along the path of the web 20*w*, or may accomplish printing after the web 20*w* is cut into sheets. The printer 81 may be of any conventional type.

An adhesive coating 30*w* is then applied to the other surface of the face sheet material web 20*w* using conventional adhesive coating equipment 82, which may include, for example, a transfer roller 83 and a pressure roller 84 which are in spaced relation to one another to permit the face sheet material web 20*w* to pass therebetween while being held against the transfer roller 83 by the pressure roller 84. In general, adhesive is deposited onto raised portions (not shown) of the transfer roller 83 as the raised portions travel past adhesive reservoir 85. Transfer roller 83 carries the adhesive from the adhesive reservoir 85 and transfers the adhesive onto the face sheet material web 20*w* in a pattern corresponding to the desired locations at which the release sheet material web 40*w* is to be adhesively secured to the face sheet material web 20*w*. That is, at all locations on the face sheet material web 20*w* except at pocket-forming windows 31 (FIG. 6). Alternatively, adhesive may be applied to the release sheet 40*w*, rather than to the face sheet 20*w*, prior to superimposing the face sheet 20*w* over the release sheet 40*w*.

Release sheet material web 40*w* is unwound from a second roll 40*r* and pressed against the face sheet material web 20*w*, whereby webs 20*w*, 40*w* are adhesively secured to one another to form label web 70*w*. A cutting station 86 cuts the label web 70*w* into individual label sheets 70*s* and includes a die roller 87 having a blade pattern thereon which imparts the desired perforation and cutting pattern onto the label sheets 70 and an anvil roller 88 to abut the blade pattern of die roller 87 and to form perforation or cut lines thereby. Anvil roller 88 preferably includes a continuous, solid, hard, smooth surface. For example, with reference back to FIG. 1, where it is desired to provide a label sheet 70 having separation lines 71, 72 which pass through the release sheet 40*s*, die roller blade pattern 87 and anvil roller 88 are adapted to cut through release sheet material web 40*w*. Die roller blade pattern 87 and anvil roller 88 are also adapted, where required, to cut slot 23 (FIG. 4), slit 123 (FIG. 13), 223, 323 (FIG. 14) and pocket-forming slit 423 (FIG. 14).

Figure 13:
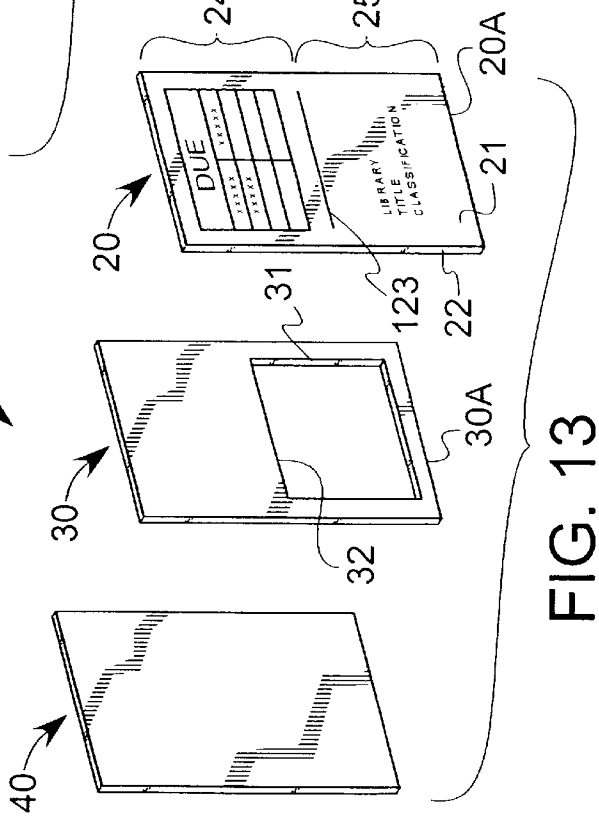
FIG. 13 is an exploded oblique view of a label according to an alternative embodiment of the present invention.

With reference to FIG. 13, a label 110 according to an alternative embodiment of the present invention includes many components in common with the label 10 (FIG. 4) according to the preferred embodiment hereof and like reference numerals represent like components. However, the label 110 according to the present embodiment includes a pocket-forming slit 123 for forming a pocket between the face layer 20 and a release layer 40 to which the label 110 is removably adhesively affixed for transportation, storage and printing. The pocket-forming slit 123 is preferably a continuous cut line which may be coextensive with the upper edge 32 of the pocket-forming window 31 of the adhesive layer 30 and which passes through the face sheet 20*s* and through the adhesive sheet 30*s* coincident with an upper edge 32 thereof, but not through the release layer 40. Preferably, however, pocket-forming slit 123 is spaced from the upper edge 32 of the pocket-forming window 31 by a nominal distance to prevent oozing of adhesive into slit 123. The label 110 may be peeled from the release layer 40 without tearing or otherwise damaging the release sheet 40.

Figure 14:
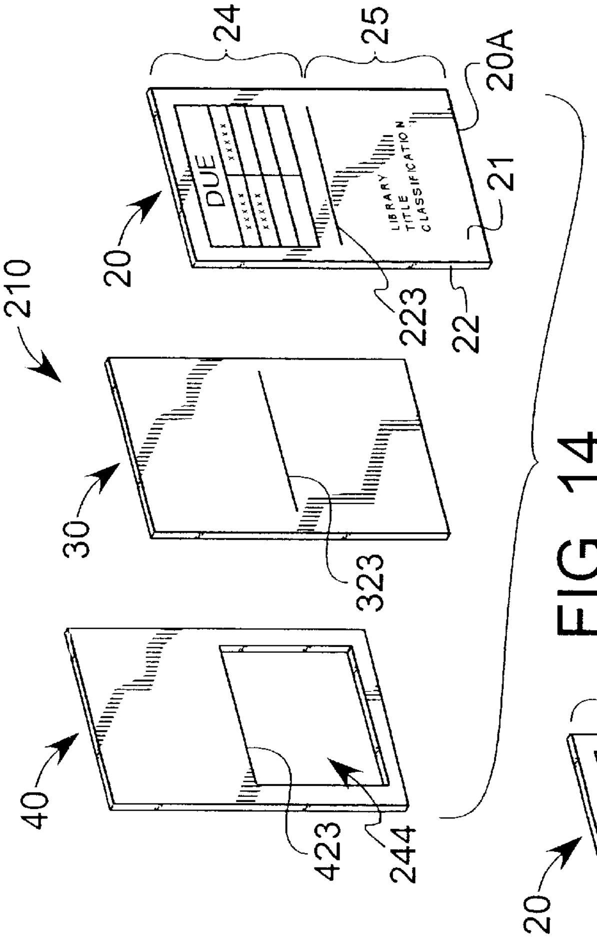
FIG. 14 is an exploded oblique view of a label according to another alternative embodiment of the present invention.

With reference to FIG. 14, a label 210 according to another alternative embodiment of the present invention includes many components in common with the label 10 (FIG. 4) according to the preferred embodiment hereof and like reference numerals represent like components. However, the label 210 according to the present embodiment includes a pocket-forming slit 223 for forming a pocket between the face layer 20 and an object to which the label 210 is affixed as hereinabove described. Adhesive layer 30 includes a slit 323 therethrough which is aligned with the pocket-forming slit 223 of the face layer 20. Release layer 40 includes a closed pocket-forming slit 423 having a shape being substantially the shape of the pocket-forming window 31 (FIG. 6) of the label 10 according the preferred embodiment hereof and defining a removable cut-out 244. Peeling the face layer 20 from the release layer 40, then, removes the cut-out 244 from within the pocket-forming slit 423 and carries the cut-out 244 on the second planar surface 22 of the face layer 20, thereby interposing the cut-out 244 between the adhesive layer 30 and the object to which the label 210 is affixed. The cut-out 244 acts as a spacer to prevent the adhesive layer 30 from adhesively securing the second planar surface 22 of the face layer 20 to the object to which the label is affixed. The label 210 according to the present embodiment, then, can be constructed from continuous layers 20, 30, 40, and does not require selective placement of adhesive layer 30, as with the preferred embodiment hereof for the purpose of defining the pocket-forming window 31 (FIG. 6).

Figure 15:
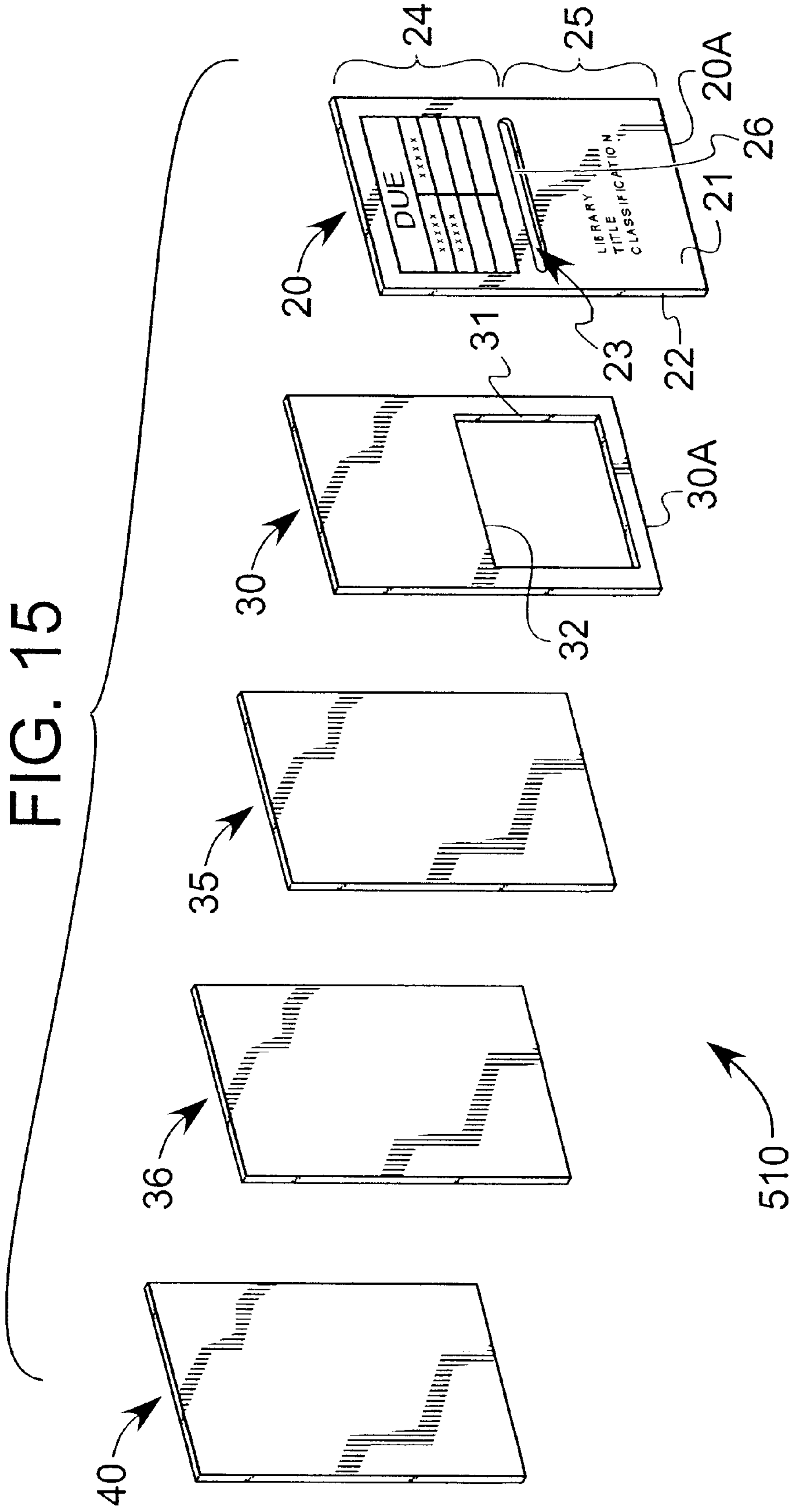
FIG. 15 is an exploded oblique view of a label according to another alternative embodiment of the present invention.
Figure 16:
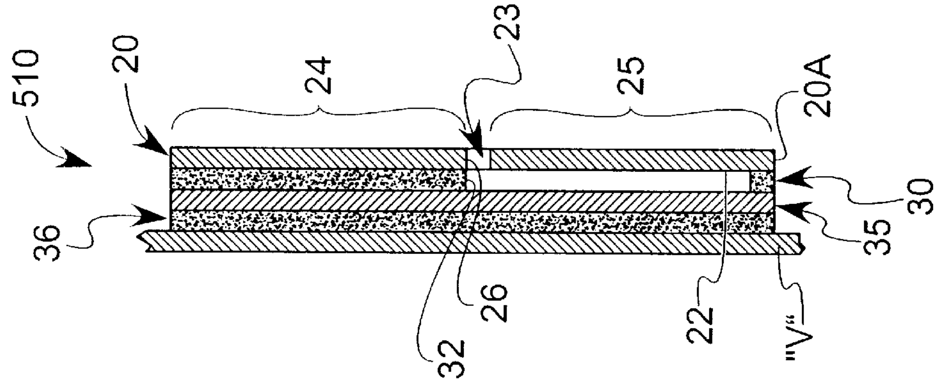
FIG. 16 is a section view of the label of FIG. 15 shown affixed to the book of FIG. 1.
Figure 17:
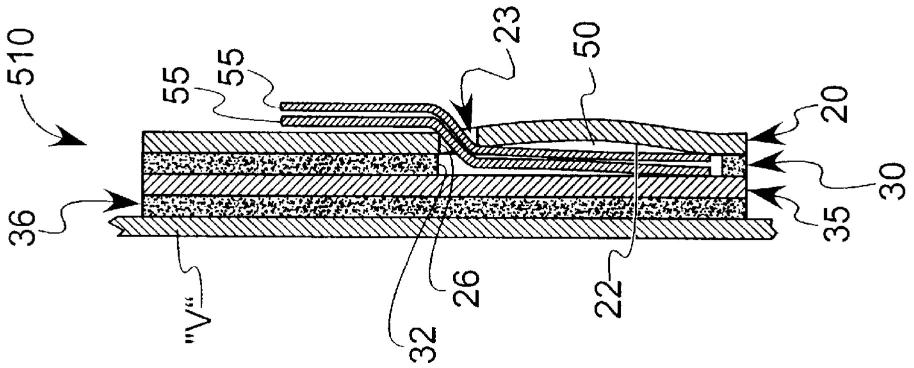
FIG. 17 is a section view of the label of FIG. 15 shown affixed to the book of FIG. 1 and showing two cards being partially received within an item-receiving pocket formed between the label and the book.

With reference to FIGS. 15–17, a label 510 according to another alternative embodiment of the present invention includes many components in common with the label 10 (FIG. 4) according to the preferred embodiment hereof and like reference numerals are intended to represent like components. However, the label 510 according to the present embodiment includes a backing layer 35 interposed between the adhesive layer 30 having the pocket-forming window 31 and the release layer 40. More particularly, backing layer 35 is constructed from thin bond paper, such as, for example, 10–20 pound weight bond paper, and is removably adhesively secured to the release sheet 40 by adhesive layer 36. Face sheet 20, then, is superimposed over and adhesively affixed to the backing layer 35, rather than to the release layer 40, as described above. Layers 20, 30, 35 and 36 peel from the release layer 40 and are integrally affixable to the inside surface of the book cover "V", as described with reference to the preferred embodiment hereof. The label 510 permits "overstuffing" of the pocket 50 formed between the face sheet 20 and the backing sheet 35, while remaining securely affixed to the book cover "V" due to the continuous layer of adhesive 36 affixing the label 510 to the book cover "V", which provides a stronger adhesive bond.

Figure 18:
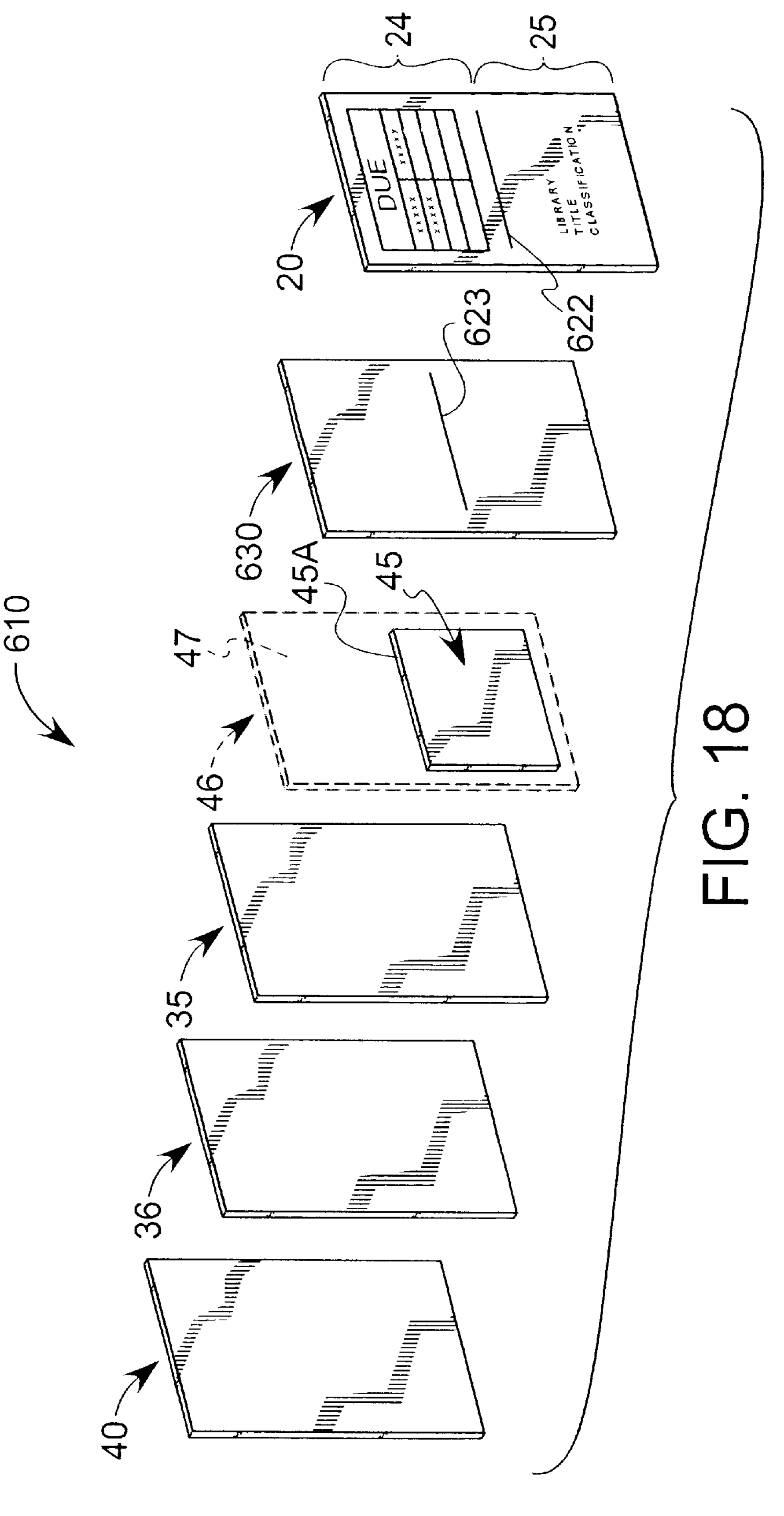
FIG. 18 is an exploded oblique view of a label according to another alternative embodiment of the present invention.
Figure 20:
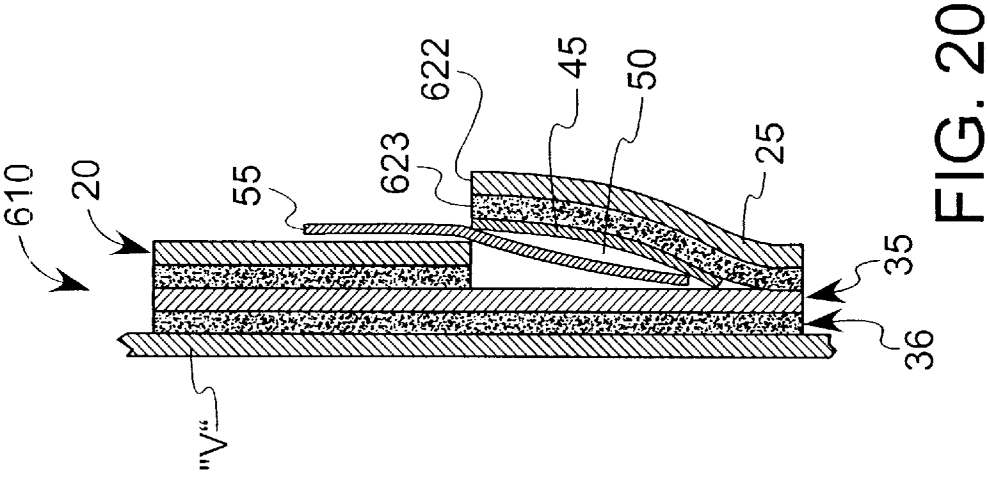
Figure 19:
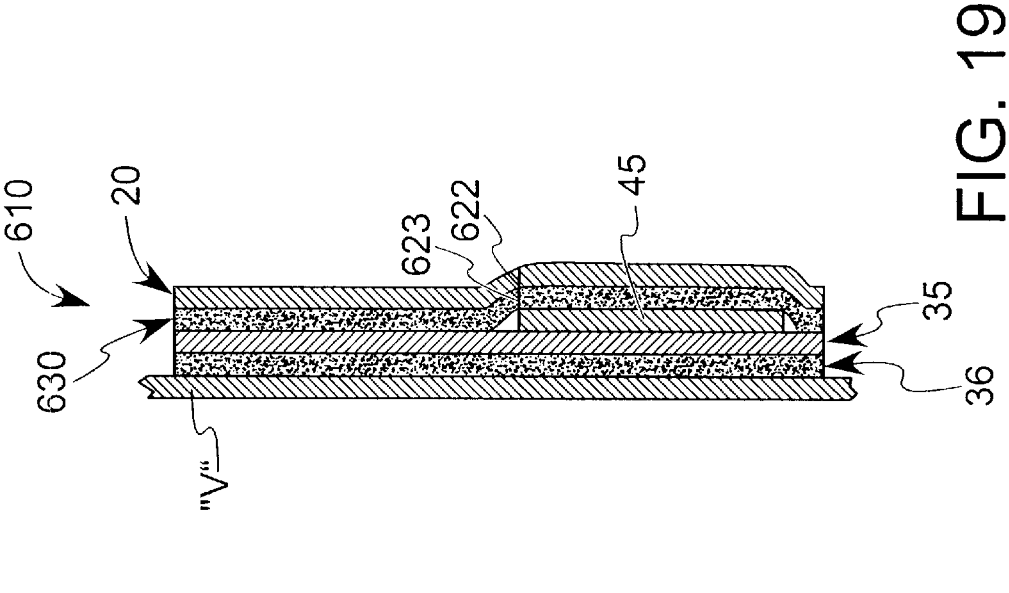
FIG. 19 is a section view of the label of FIG. 18 shown affixed to the book of FIG. 1; and, FIG. 20 is a section view of the label of FIG. 18 shown affixed to the book of FIG. 1 and showing a card being partially received within an item-receiving pocket formed between the label and the book.

With reference to FIGS. 18–20, a label 610 according to another alternative embodiment of the present invention includes many components in common with the label 510 (FIG. 15) according to the previous embodiment hereof shown in FIGS. 15–17 and like reference numerals are intended to represent like components. However, the label 610 according to the present embodiment includes a continuous adhesive layer 630 superimposed over the face sheet 20 and having a slit 623 therethrough aligned with the slit 622 in the face sheet 20. The adhesive layer 630 adhesively affixes the face sheet 20 to the backing layer 35, which is removably adhesively affixed to the release layer 40 by continuous adhesive layer 36. A spacer 45 is interposed between adhesive layer 630 and backing layer 35, positioned behind the lower region 25 of the face sheet 20 downwardly adjacent the slit 623, to prevent the portion of the face sheet 20 below the slit 622 from being adhesively affixed to the backing layer 35, thereby defining the pocket 50 between the face sheet 20 and the backing layer 35. Spacer 45 may be positioned within the label 610 during manufacture thereof by providing a sheet 46 of release material, such as silicone-coated paper, cutting around the edge 45*a* of the spacer 45 and removing the so-called "matrix" 47 prior to arranging the layers 20, 630, 35, 36, 40 as shown.

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Accordingly, modifications are contemplated which can be made without departing from either the spirit or the scope of the present invention.

What is claimed is:

1. A method of affixing a label to a book such that between them they are configured to hold a library check-out card, said method comprising:

configuring said label to comprise:

a face layer having a first planar surface and a second planar surface, said face layer having a slit therein; and an adhesive layer superimposed over said second planar surface of said face layer to adhesively affix said label to said book so as to define an item-receiving pocket between said book and said face layer, said item-receiving pocket being in communication with said slit, said item-receiving pocket being formed by a pocket-forming window in said adhesive layer, said pocket-forming window being in communication with said slit; and attaching said adhesive layer to a planar surface on said book.

2. The method of claim 1, comprising the additional steps of:

configuring said face layer to include a release layer removably affixed to said second planar surface thereof; and removing said release layer from said label before said label is affixed to said book.

3. The method of claim 1, further including an item being partially received by said item-receiving pocket through said slit to hold said item adjacent said book.

4. The method of claim 1, said first planar surface of said face layer being suitable to receive printed indicia thereon.

5. A method of using a sheet of library book check-out card labels, said method comprising:

configuring said sheet to comprise:

a plurality of labels, each of said labels comprising:

a face layer having a first planar surface and a second planar surface, said face layer having a slit therein; and an adhesive layer superimposed over said second planar surface of said face layer to adhesively affix said label to a surface of a book so as to define an item-receiving pocket between said book and said face layer, said item-receiving pocket being in communication with said slit, said item-receiving pocket being formed by a pocket-forming window in said adhesive layer, said pocket-forming window being in communication with said slit; and at least one separation line dividing said sheet into said plurality of labels, such that each of said plurality of labels are individually removable from said sheet along said at least one separation line;

removing at least one of said plurality of labels from said sheet; and attaching said adhesive layer to a planar surface of a library book.

6. The method of claim 5, wherein said at least one separation line is a perforation line.

7. A method according to claim 1, wherein said planar surface on said book is an inner surface.

8. A method according to claim 7, wherein said inner surface is the back flap.

9. A method of facilitating the recordation of library book transactions on a library check-out card, said method comprising:

configuring a library book check-out card label to comprise:

a face layer having a first planar surface and a second planar surface, said face layer having a slit therein; and an adhesive layer superimposed over said second planar surface of said face layer to adhesively affix said label to said book so as to define an item-receiving pocket between said book and said face layer, said item-receiving pocket being in communication with said slit, said item-receiving pocket being formed by a pocket-forming window in said adhesive layer, said pocket-forming window being in communication with said slit;

attaching said adhesive layer to a planar surface on a library book; and establishing selective contact between said library check-out card and said item-receiving pocket in said library check-out card label.

10. A method according to claim 9, comprising the additional steps of:

removing said check-out card from said item-receiving pocket; and recording information on said check-out card.

11. A method according to claim 10, wherein said step of recording information on said check-out card comprises entering a due date.

12. A method of using a library check-out card label, said method comprising the steps of:

configuring said label to comprise:

a face layer having a first planar surface and a second planar surface, said face layer having a slit therein;

an adhesive layer superimposed over said second planar surface of said face layer to adhesively affix said label to a book so as to define an item-receiving pocket between said book and said face layer, said item-receiving pocket being in communication with said slit, said item-receiving pocket being formed by a pocket-forming window in said adhesive layer, said pocket-forming window being in communication with said slit; and at least one region on said first planar surface onto which variable indicia may be printed; and attaching said adhesive layer to a planar surface on said book.

13. A method according to claim 12, further comprising the additional step of printing variable indicia on said at least one region prior to said attaching step.

14. A method according to claim 13, wherein an automated printing device is used to affect said step of printing variable indicia on said at least one region.

15. A method according to claim 14, wherein said automated printing device is a non-impact printer.

16. A method according to claim 15, wherein said non-impact printer is a cut sheet laser printer.

17. A method according to claim 15, wherein said non-impact printer is a thermal transfer printer.

18. A method of making a library check-out card label, said method comprising the steps of:

configuring a face layer to include a first planar surface and a second planar surface opposite said first planar surface;

defining at least one region on said first planar surface onto which variable indicia may be printed;

placing a slit in said face layer;

superimposing an adhesive layer over said second planar surface, said adhesive layer configured to adhesively affix said label to a book so as to define an item-receiving pocket between said book and said face layer, said item-receiving pocket being in communication with said slit, said item-receiving pocket being formed by a pocket-forming window in said adhesive layer, said pocket-forming window being in communication with said slit; and placing a release layer over said adhesive layer, thereby forming said label comprising said face layer, adhesive layer and release layer.

19. A method according to claim 18, wherein said at least one region comprises:

a first region between said slit and one edge of said face layer; and a second region between said slit and an opposite edge of said one edge of said face layer.

20. A method according to claim 19, comprising the additional step of printing a grid onto one of said first and second regions, said grid defining a repeating array of cells inside which said variable indicia may be added.

21. A method according to claim 18, comprising the additional step of configuring said label to accept said variable indicia from an automated printing device.

22. A method according to claim 21, wherein said automated printing device is a non-impact printer.

23. A method according to claim 22, wherein said non-impact printer is a cut sheet printer.

24. A method according to claim 22, wherein said non-impact printer is a thermal transfer printer.

* * * * *

UNITED STATES PATENT AND TRADEMARK OFFICE

CERTIFICATE OF CORRECTION

PATENT NO. : 6,547,914 B2 Page 1 of 1
DATED : April 15, 2003
INVENTOR(S) : Schnitzer et al.

It is certified that error appears in the above-identified patent and that said Letters Patent is hereby corrected as shown below:

Column 6,
Line 9, "10 d to an" should read -- 10d) to an --

Figure 2:
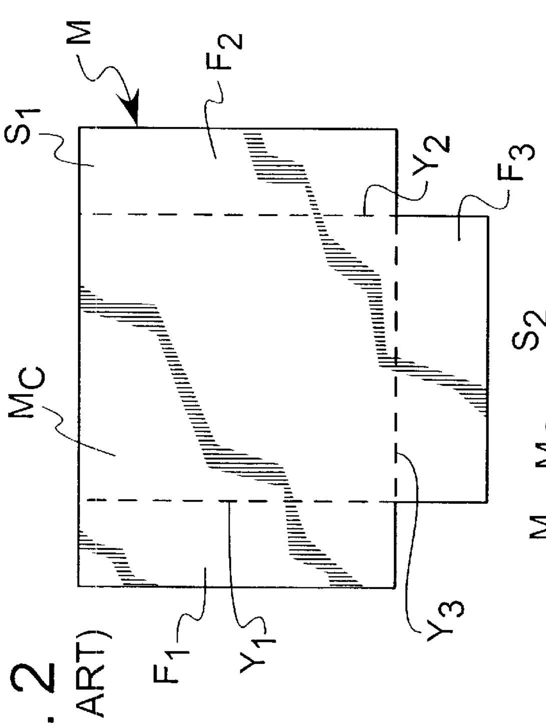
FIG. 2 (PRIOR ART)
FIG. 2 is a front view of the prior art pocket of FIG. 1, showing the pocket in an unfolded orientation.
Figure 3:
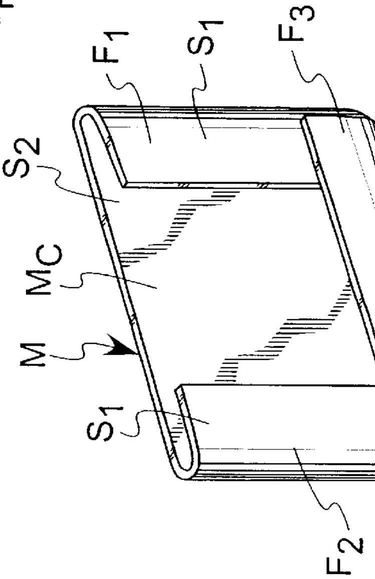
FIG. 3 (PRIOR ART)
FIG. 3 is a rear oblique view of the prior art pocket of FIG. 1, showing the pocket in a folded orientation.
Figure 1:
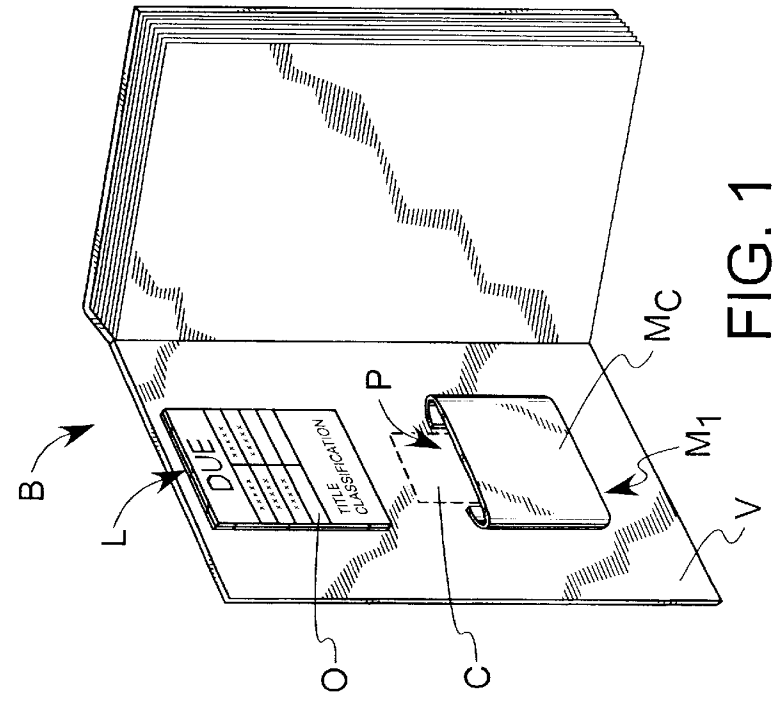
FIG. 1 (PRIOR ART)
FIG. 1 is an oblique view of a book having a prior art label affixed to an inside surface thereof and having a prior art folded pocket formed on an inside surface thereof.

Column 8,
Line 6, "Fig 1," should read -- Fig 11, --

Signed and Sealed this

Twenty-sixth Day of August, 2003

JAMES E. ROGAN
*Director of the United States Patent and Trademark Office*